No. 728,106. PATENTED MAY 12, 1903.
A. W. HOCKMAN.
RESILIENT TIRE.
APPLICATION FILED FEB. 12, 1903.
NO MODEL.
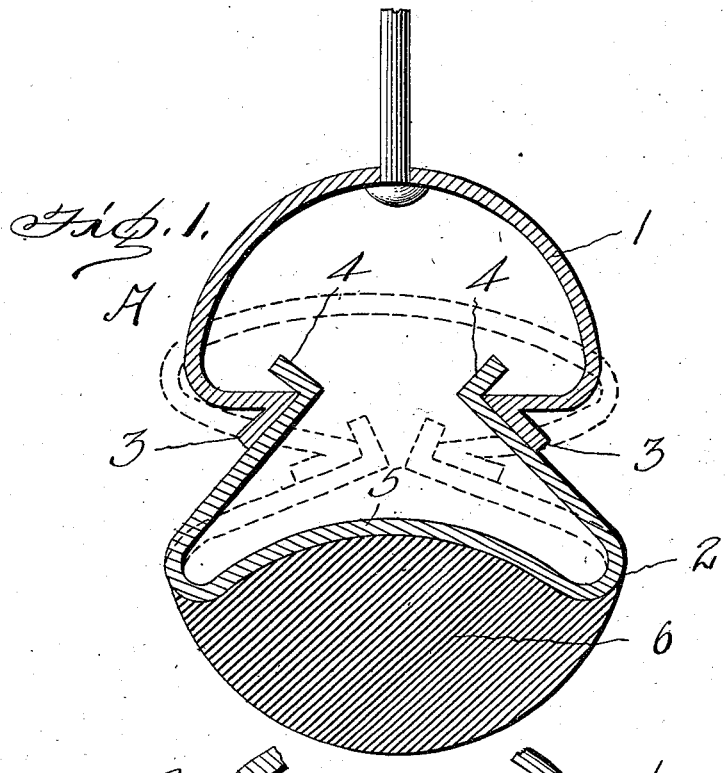
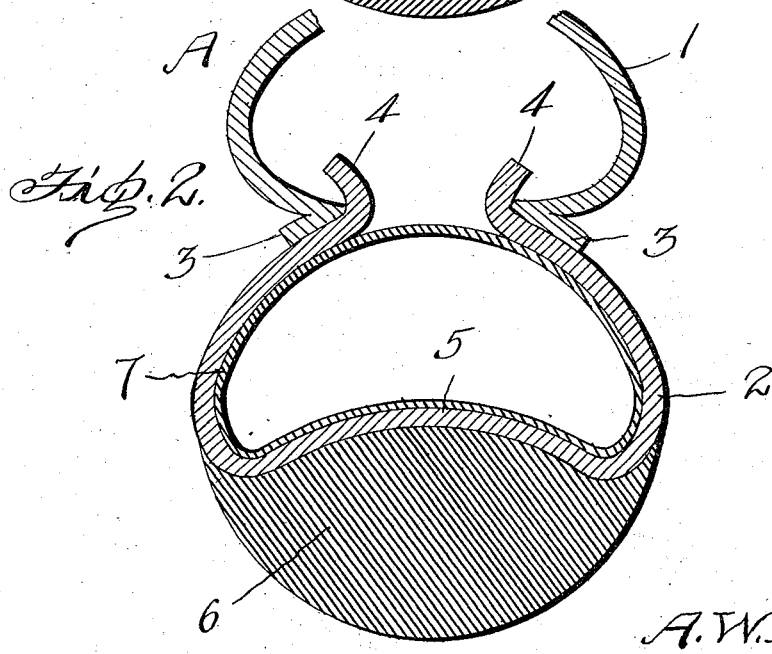

No. 728,106. Patented May 12, 1903.

UNITED STATES PATENT OFFICE.

ANTHONY W. HOCKMAN, OF CLARKSBURG, WEST VIRGINIA.

RESILIENT TIRE.

SPECIFICATION forming part of Letters Patent No. 728,106, dated May 12, 1903.

Application filed February 12, 1903. Serial No. 143,084. (No model.)

*To all whom it may concern:*

Be it known that I, ANTHONY W. HOCKMAN, a citizen of the United States, residing at Clarksburg, in the county of Harrison and State of West Virginia, have invented certain new and useful Improvements in Resilient Tires; and I do declare the following to be a full, clear, and exact description of the invention, such as will enable others skilled in the art to which it appertains to make and use the same.

This invention relates to a resilient tire for vehicle-wheels.

The object of the invention is to provide a non-puncturable tire which is simple of construction, efficient in use, comparatively inexpensive of production, and susceptible of being easily manufactured.

With this object in view the invention consists in certain novel features of construction, combination, and arrangement of parts, which will be hereinafter more fully described, and particularly defined in the appended claims.

In the accompanying drawings, Figure 1 is a cross-section of a wheel rim and tire embodying my invention, and Fig. 2 is a similar view showing a modification in the construction.

Referring now more particularly to the drawings, the letter A represents a wheel-rim constructed in accordance with my invention and composed, as shown, of channeled sections 1 and 2, arranged in apposition, the longitudinal side edges of the inner section 1 being bent outwardly at an oblique angle to form stop-flanges 3, and the longitudinal side edges of the outer section 2 being bent upwardly and laterally to form hooks or locking-flanges 4, which project over upon the inner sides of the side edges of the section 1 and effect a locking engagement therewith, thereby holding the two sections united. The sections 1 and 2 are made of spring metal, such as spring-steel, and the sides of the section 2 extend outwardly at an angle in a plane parallel with the flanges 3 of the section 1, so as to form side arms, which are adapted to yield inwardly, as shown in broken lines, to give the desired resilient action. The outer face of the section 2 is segmentally recessed to form a seat 5 for the tread 6, which latter preferably consists of a substantially semicircular annulus of vulcanized rubber, cemented or otherwise secured to said section.

In the operation of the device it will be readily understood that when pressure falls upon the tread 6 and is transferred to the section 2 the side arms of the latter will yield outwardly and the sides of the section 1 will also yield to some extent inwardly, as indicated in dotted lines, thus allowing the tread to yield or give to a greater extent than it could otherwise under its natural resiliency, and to thereby provide a wheel-tire which is of ample flexibility to absorb vibration and yet is sufficiently strong to withstand rough usage and wear. In the construction shown in Fig. 2 the section 2 is made of circular form and receives an air tube or sack 7, which gives an additional cushioning action.

From the foregoing description, taken in connection with the accompanying drawings, the construction, mode of operation, and advantages of my invention will be readily apparent, it is thought, without requiring a more extended explanation.

Various changes in the form, proportion, and the minor details of construction may be resorted to without departing from the principle or sacrificing any of the advantages of the invention.

Having thus described my invention, what I claim as new, and desire to protect by Letters Patent, is—

1. In a resilient tire for vehicle-wheels, the combination of a rim composed of two channeled sections made of spring metal and arranged in apposition, the outer section having a greater yielding capacity than the inner section, and a tread carried by the outer section, substantially as described.

2. In a resilient tire for vehicle-wheels, the combination of a rim formed of two channeled sections made of spring metal, the inner section being provided with outwardly-projecting flanges and the outer section with flanges projecting over upon the inner edges of the inner section and interlocking therewith, and a tread carried by said outer section, substantially as described.

In testimony whereof I have hereunto set my hand in presence of two subscribing witnesses.

ANTHONY W. HOCKMAN.

Witnesses:
W. F. DAVIS,
J. C. KITZMILLER.